United States Patent [19]
McCalmont

[11] Patent Number: 5,494,269
[45] Date of Patent: Feb. 27, 1996

[54] VIBRATION DAMPER

[75] Inventor: Paul E. McCalmont, Cincinnati, Ohio

[73] Assignee: Cincinnati Milacron Inc., Cincinnati, Ohio

[21] Appl. No.: 296,634

[22] Filed: Aug. 26, 1994

[51] Int. Cl.$^6$ .................................................. B23Q 3/02
[52] U.S. Cl. ......................... 269/224; 269/228; 269/310
[58] Field of Search ..................... 248/630, 623, 248/632, 634, 635, 638; 267/140.11, 140.12, 140.13, 140.3; 407/9, 10; 408/143; 269/224, 310, 228

[56] References Cited

U.S. PATENT DOCUMENTS

| | | | |
|---|---|---|---|
| 2,867,003 | 1/1959 | Stiles | 269/224 |
| 3,522,864 | 8/1970 | Richter . | |
| 3,692,370 | 9/1972 | Hasz . | |
| 3,998,444 | 12/1976 | Stockwell | 269/310 |
| 4,054,280 | 10/1977 | Alberts | 269/224 |
| 4,438,599 | 3/1984 | Kamman et al. . | |
| 4,635,911 | 1/1987 | Lovrenich | 269/224 |
| 4,821,393 | 4/1989 | Spigarelli | 269/224 |
| 4,960,269 | 10/1990 | Fong | 269/224 |
| 5,033,340 | 7/1991 | Siefring . | |
| 5,040,764 | 8/1991 | DuBois . | |

FOREIGN PATENT DOCUMENTS

| | | | |
|---|---|---|---|
| 5547 | 11/1878 | Germany | 269/310 |

OTHER PUBLICATIONS

Reid Tool Supply Company, Muskegon, MI, Catalog—Spring/Summer 1994 Edition pp. 166–171, (DE-STA-CO Toggle Clamps), and pp. 290–291 (chuck jaw grippers).

Barrymount Machinery Mounts, Vlier Engineering Company, Burbank, CA catalog No. MM-10, copr. 1986, pp. 2–5, 15, 18.

Shock and Vibration Handbook, 2d Ed. bu C. M. Harris and C. E. Crede, McGraw-Hill Book Company, New York, NY, copr. 1976, pp. 35-15, 35-16, 35-17, 40-2, 40-9, 40-10.

*Primary Examiner*—Robert C. Watson
*Attorney, Agent, or Firm*—Thomas M. Farrell

[57] ABSTRACT

A workpiece is clamped to a machine table while being machined, but a cantilevered portion of the workpiece is subject to vibrations. The cap of a vibration damping unit is supported on the machine base and spring-loaded upwardly against the workpiece. A support spring acting on a seat forces a damping element against the cap which, in turn, is impressed against the cantilevered workpiece. Vibrations are suppressed by horizontal shearing motion of the ring damping element. The entire damping assembly comprising the cap, ring damping element, seat and spring are retracted from the workpiece by means of a central rod connected to a manually actuated toggle clamp.

6 Claims, 1 Drawing Sheet

VIBRATION DAMPER

FIELD OF INVENTION

This invention relates to visco-elastic dampers for attenuating workpiece vibrations.

BACKGROUND OF THE INVENTION

This invention belongs to the broad class of dampers and absorbers which utilize visco-elastic elements, but, whereas many visco-elastic dampers also include an auxiliary mass, forming a tuned damper system, the present invention does not include an auxiliary mass. Also, many prior art systems for attenuating vibrations require the condition that the damped object be somehow fully supported on visco-elastic elements, so that the entire object is free to move. In contradistinction, the present invention comprises a system where one portion of a workpiece is tightly clamped to a machine base, and another portion of the workpiece, cantilevered from the clamped portion, is then intimately contacted by a visco-elastically supported pad. The invention is especially useful in those applications where the overhang is irregular or not otherwise readily supportable by conventional props and supports.

The use of visco-elastic elements in machine members is well-known. For example, U.S. Pat. No. 3,522,864 of R. C. Richter, Aug. 4, 1970, entitled Tuned Damper Assembly for Machine Tools, illustrates a tuned damper applied to machine tools, where a machine element is fitted with an annular visco-elastic absorber element. A damper mass is mounted onto, and preloaded against, the absorber element by springs and bolts.

U.S. Pat. No. 3,692,370, of J. R. Hasz, Sep. 19, 1972, entitled Damping Means For Increasing the Minimum Stiffness of a Shaft, teaches increasing the minimum dynamic stiffness of a spindle by having a sleeve of visco-elastic material bonded to the spindle between the spindle supports. A rigid sleeve surrounds the visco-elastic sleeve to constrain the visco-elastic material and increase its shear strains.

An example of the use of visco-elastic elements in a tool support is found in U.S. Pat. No. 5,033,340, of L. T. Siefring, Jul. 20, 1991, entitled Apparatus and Method for Tool Vibration Damping, where alternate layers of visco-elastic solid material and steel are layered to produced a damping sandwich at the joint in the machine tool between the cutting tip and the tool mounting area.

U.S. Pat. No. 5,040,764, of N. J. DuBois, Aug. 20, 1991, entitled Low Frequency Vibration Absorber, teaches a mounting assembly for absorbing low frequency vibrational energy produced by a source that is mounted to a base member. The mount comprises soft, spongy material, preferably foam material, to provide isolation.

An example of a workpiece damper used when machining is found in U.S. Pat. No. 4,438,599 of J. T. Kamman et al, Mar. 27, 1984, entitled Vibration Damper for Machine-carried Workpiece. Here, a slender, rotary workpiece is supported at both ends. A shoe contacts the rotating workpiece, and the blocky shoe is supported in a retractable shoe holder by a pair of elastomeric elements, oppositely disposed and preloaded against each other; the shoe is then preloaded against the workpiece in a direction transverse to the preload direction of the opposed elastomeric elements.

Th problems inherent in machining a workpiece which, at one portion, is fully clamped to a machine table, and yet, which has an overhanging portion, capable of free vibration, are obviated by the present invention.

SUMMARY OF THE INVENTION

The invention is shown embodied in a metal cutting machine tool where a workpiece has a fixed portion clamped to a machine base, and a free portion extending from the fixed portion, having a damper for controlling vibrations, comprising: a damper mass affixed to the machine base; a support member movably guided by the damper base a contact member; an elastomeric element interposed between the support member and contact member; biasing means for advancing the members and the element toward the workpiece, and compressing the elastomeric element, such that the contact member contacts the workpiece under a preload and means for overcoming the biasing means and retracting the contact member from the workpiece.

DESCRIPTION OF THE INVENTION

At the outset, it should be noted that certain attitudinal references contained herein, for example, "vertical", "horizontal", are made for the purpose of illustrating the preferred embodiment; the invention is not to be limited by these references and will find application in many spatial orientations.

Figure 1:
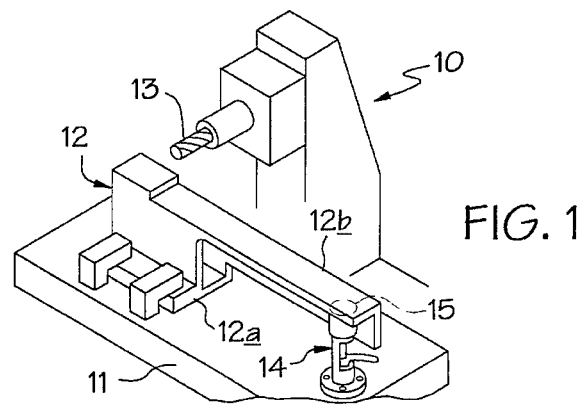
FIG. 1 is a perspective view showing a machine tool having a workpiece supported on a machine table, and having a damper unit applied to a cantilevered portion of the workpiece.

FIG. 1 of the drawings illustrates a machining center 10 such as the MAXIM horizontal machining center, available from Cincinnati Milacron Inc., assignee of the present invention. This machine 10 has a pallet which is rigidly attached to the machine 10, and which forms a table 11 for supporting the workpiece 12. The machine 10 includes a rotary cutter 13 which is applied periodically to the workpiece 12 to remove metal during an automatic operation. The workpiece 12 has one portion 12a clamped solidly to the machine table 11, either directly or by intermediate solid fixture parts (not shown), and the workpiece 12 has another, cantilevered portion 12b which extends to one side of the machined area. Due to the free nature of this cantilevered portion 12b, cutting forces may often generate vibrations in the workpiece 12. Here it should be noted that, due to variations in form, surface irregularities, tolerance variations, etc., such workpieces 12 are not always readily supportable by conventional props and supports. Therefore, a modular damping unit 14 is also clamped to the machine table 11; the table 11 thus forms a common base for the clamped workpiece 12 and the vibration damping unit 14. The damping unit 14 includes a movable damping cap 15 which may be spring-loaded against the workpiece 12 in the vertical direction during the machining cycle; afterward, when it is desired to remove the workpiece 12 from the table 11, the spring-loaded cap 15 may be retracted and locked into a retracted position away from the workpiece 12.

Figure 2:
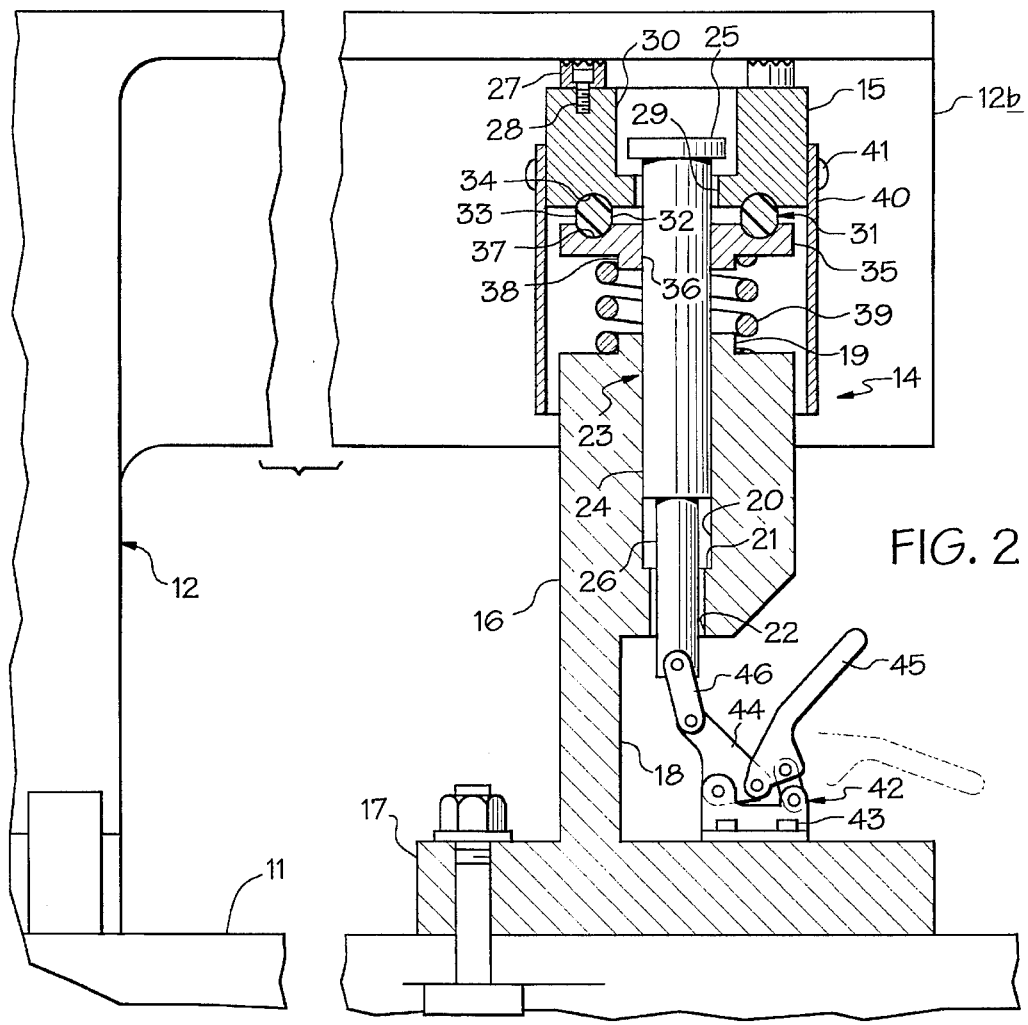
FIG. 2 is an enlarged elevational view, in partial section of the machine tool of FIG. 1, showing the machine table, clamped workpiece, and damper unit interposed between the table and the cantilevered portion of the workpiece.

FIG. 2 is an enlarged view showing the machine table 11 with the workpiece 12 clamped thereto, and the horizontal, cantilevered portion 12b of the workpiece 12 supported by the vibration damping unit 14. The unit 14 includes a cylindrical damper base 16 having a flange 17 affixed to the machine table 11. The damper base 16 has a side recess 18 and a short pilot diameter 19 at its top end. A large, accurate vertical bore 20 extends from the top end and terminates at an interior shoulder 21. A small clearance 22 hole extends colinearly through to the recess 18. A support member 23 is movably guided by the damper base 16; i.e., the support member comprises, in part, a cylindrical rod 24 which slides in the close-fitting bore 20 of the damper base 16. The rod 24 has a head 25 at its top end which is captive with the damper cap 15, and has a reduced diameter 26 which extends through the damper base hole 22. The rod 24 should be fairly stiff, so in a preferred form, the main diameter is approximately 90 mm (3.5 inches). The cap 15 is cylindrical, having three serrated pads 27 affixed to its top surface by screws 28, to insure good contact with the surface of the workpiece 12. The pads 27 are substantially like chuck jaw grippers available from Reid Tool Supply Company, Muskegon, Mich. The cap 15 has a central clearance hole 29 and a top counterbore 30, through which the rod 24 is assembled, and the cap 15 is engageable by the rod head 25 when the rod 24 is downwardly retracted. When in the up position, the head 25 does not touch the cap 15. The bottom of the cap 15 is supported on a visco-elastic, elastomeric ring damping element 31. The damping element 31 is generally shaped as a torus, having truncated inner and outer diameters 32,33, and is seated in an annular groove 34 in the bottom of the cap 15. The support member 23 also comprises a pressure disk 35 for the clamping element 31. The pressure disk 35, is slidable on the rod by means of a close-fitting central bore 36, and the disk 35 has an annular groove 37 in its top surface for centrally supporting the ring damping element 31. The disk 35 has a short pilot diameter 38 at its bottom end for centering a vertical support spring 39. The support spring 39 is a helical compression spring guided at its bottom end by the short pilot diameter 19 of the damper base. A protective skirt 40, formed as a tubular sleeve and affixed to the cap 15 by screws 41, extends downwardly over the damper base 16. Sufficient clearance is provided between the skirt 40 and base 16 so that small horizontal movement of the cap 15 may be accommodated without "shorting out" the action of the ring damping element 31 by metal-to-metal contact of the skirt 40 with the damper base 16. A toggle clamp 42 is mounted within the damper base recess 18 by screws 43. The toggle clamp 42 is commercially available under the trademark DE-STA-CO, from Reid Tool Supply Company, Muskegon, Mich., and has an output bar 44 movable in response to a manually-movable lever, or handle 45. The bar 44 is linked to the rod 24 by a suitable linkage 46. The toggle clamp handle 45, manually actuated between up and down positions, provides a mechanical advantage over load seen by the bar 44, and will lock when the rod 24 is retracted. With the bar 44 in the up position, the rod 24 is moved fully upward, thereby allowing the support spring 39 to drive the damping cap 15 upwardly against the workpiece 12 to attenuate the workpiece vibration. The spring 29 should apply a substantial load, so in a preferred form, the load should be in the range of 40–120 kg (100–300 lbs.) When the toggle clamp handle 45 is thrown to the down position (shown in phantom), the rod 24 will be pulled downwardly to where its head 25 contacts the damping cap counterbore 30, thereby overcoming the biasing load of the support spring, and retracting the damping cap 15, ring damping element 31, and pressure disk 35 from the workpiece 12. The toggle clamp 42 provides a lockdown position, until the machined workpiece 12 is unloaded and a new, unmachined workpiece 12 substituted therefor. While the levered clamp 42 is intended for manual operation, it is contemplated that a powered retraction device (e.g., an air cylinder) may be utilized for automatic application of the damping unit 14.

The ring damping element 31 is intended to primarily damp the workpiece 12 by providing for horizontal shearing movement of the cap 15 relative to the disk 35. However, those skilled in the art will appreciate that some vibrations will attenuated by vertical movement of the damping cap 15 against the ring damping element 31. It will also be appreciated that other shapes of visco-elastic damping elements may be substituted.

While the invention has been shown in connection with a preferred embodiment, it is not intended that the invention be so limited rather, the invention extends to all such designs and modifications as come within the scope of the appended claims.

What is claimed is:

1. In a metal cutting machine tool, where a workpiece has a fixed portion clamped to a machine base, and a free portion extending from said fixed portion, a damper for controlling vibrations, comprising:

a damper base affixed to said machine base;

a support member movably guided by said damper base;

a contact member;

an elastomeric element interposed between said support member and said contact member;

biasing means for advancing said members and said element toward said workpiece in a first direction, and compressing said elastomeric element, such that said contact member contacts said workpiece under a preload;

means for permitting said contact member to move in a second direction, transverse to said first direction, while said elastomeric element is compressed in said first direction, and thereby imparting a vibration-damping shearing motion to said elastomeric element; and means for overcoming said biasing means and retracting said contact member from said workpiece.

2. The damper of claim 1, wherein said support member includes a rod portion guided in said damper base, and a seat for said elastomeric element, and wherein said elastomeric element is ring-shaped.

3. The damper of claim 2, wherein said overcoming means includes a lever for retracting said rod portion of said support member, and wherein said rod portion includes means for engaging said contact member during retraction of said contact member.

4. In a metal cutting machine tool, where a workpiece has a fixed portion clamped to a machine base, and a free portion extending from said fixed portion, a damper for controlling vibrations, comprising:

a damper base affixed to said machine base;

a support member movably guided by said damper base;

a contact member;

an elastomeric element interposed between said support member and said contact member;

spring biasing means for advancing said members and said element toward said workpiece in a first direction, and compressing said elastomeric element, such that said contact member contacts said workpiece under a preload;

means for permitting said contact member to move in a second direction, transverse to said first direction, while said elastomeric element is compressed in said first direction, and thereby imparting a vibration-damping shearing motion to said elastomeric element; and means for overcoming said spring biasing means and retracting said contact member from said workpiece.

5. The damper of claim 4, wherein said support member includes a rod portion guided in said damper base, and a seat for said elastomeric element, and wherein said elastomeric element is ring-shaped.

6. The damper of claim 5, wherein said overcoming means includes a toggle clamp including a bar for retracting said rod portion of said support member, and wherein said rod portion includes means for engaging said contact member during retraction of said contact member.

\* \* \* \* \*